(12) United States Patent
Gurram et al.

(10) Patent No.: US 10,983,832 B2
(45) Date of Patent: Apr. 20, 2021

(54) MANAGING HETEROGENEOUS MEMORY RESOURCE WITHIN A COMPUTING SYSTEM

(71) Applicant: International Business Machines Corporation, Armonk, NY (US)

(72) Inventors: Nagendra K. Gurram, Bangalore (IN); Saravanan Sethuraman, Bangalore (IN); Edgar R. Cordero, Round Rock, TX (US); Anuwat Saetow, Austin, TX (US); Diyanesh B. Chinnakkonda Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 16/275,716

(22) Filed: Feb. 14, 2019

(65) Prior Publication Data

US 2020/0264936 A1    Aug. 20, 2020

(51) Int. Cl.
*G06F 9/46*  (2006.01)
*G06F 9/50*  (2006.01)
*G06F 13/16* (2006.01)
*G06F 9/38*  (2018.01)

(52) U.S. Cl.
CPC .......... *G06F 9/5044* (2013.01); *G06F 9/3891* (2013.01); *G06F 9/5066* (2013.01); *G06F 9/5077* (2013.01); *G06F 13/1663* (2013.01); *G06F 2209/501* (2013.01); *G06F 2209/506* (2013.01)

(58) Field of Classification Search
CPC .................................................. G06F 9/5044
USPC ....................................................... 718/104
See application file for complete search history.

(56) References Cited

U.S. PATENT DOCUMENTS 4,503,495 A *  3/1985  Boudreau ............. G06F 11/349
                                                   710/241
6,021,076 A    2/2000  Woo et al.
6,272,612 B1   8/2001  Bordaz
                       (Continued)

FOREIGN PATENT DOCUMENTS

EP          1600844 A3    6/2008
WO       2013090926 A1    6/2013

OTHER PUBLICATIONS

Sharma et al., "Balance of Power: Dynamic Thermal Management for Internet Data Centers", Jan./Feb. 2005, Published by the IEEE Computer Society, pp. 42-49.

(Continued)

*Primary Examiner* — Evral E Bodden
(74) *Attorney, Agent, or Firm* — Daniel R. Simek

(57) ABSTRACT

A method for configuring hardware within a computing system. The method includes one or more computer processors identifying information respectively associated with a plurality of hardware resources within a portion of a computing system. The method further includes determining whether a set of memory modules of differing performance ratings are operatively coupled to a shared bus fabric. The method further includes responding to determining that the set of memory modules of differing performance ratings is operatively coupled to the shared bus fabric by configuring a subsystem to selectively access respective groups of memory modules within the set of memory modules based on a performance rating corresponding to a respective group of memory modules.

20 Claims, 5 Drawing Sheets

(56) References Cited

U.S. PATENT DOCUMENTS

| | | |
|---|---|---|
| 7,089,461 B2 | 8/2006 | Gilbert |
| 8,549,333 B2 | 10/2013 | Jackson |
| 8,595,379 B1 | 11/2013 | Brandwine |
| 8,694,279 B1 | 4/2014 | Stiver |
| 9,110,592 B2 | 8/2015 | Lee |
| 10,503,550 B2 * | 12/2019 | Gupta .................. G06F 9/5027 |
| 2007/0061612 A1 | 3/2007 | Henderson |
| 2008/0140962 A1 | 6/2008 | Pattabiraman |
| 2009/0282300 A1 | 11/2009 | Heyrman |
| 2014/0052311 A1 | 2/2014 | Geissler |
| 2014/0104784 A1 | 4/2014 | Chen |
| 2014/0156829 A1 | 6/2014 | Lee |
| 2016/0132266 A1 | 5/2016 | Greenfield |
| 2018/0288101 A1 * | 10/2018 | Sharma ................. H04L 9/3297 |

OTHER PUBLICATIONS

Tran et al., "Heterogeneous Memory Management for 3D-DRAM and external DRAM with QoS", Copyright 2013 IEEE, 8B-2, pp. 663-668.

Chatterjee et al., "Leveraging Heterogeneity in DRAM Main Memories to Accelerate Critical Word Access", 12 pps., printed from the Internet on Feb. 7, 2019, niladrish.org/pubs/micro12.pdf.

Schroeder et al., "DRAM Errors in the Wild: A Large-Scale Field Study", SIGMETRICS/Performance '09, Jun. 15-19, 2009, Copyright 2009, 12 pps.

* cited by examiner

MANAGING HETEROGENEOUS MEMORY RESOURCE WITHIN A COMPUTING SYSTEM

BACKGROUND OF THE INVENTION

The present invention relates generally to the field of managing computing system hardware, and more particularly to calibrating memory subsystems and managing assignments of memory resources within a computing system having non-homogeneous memory hardware.

Technological advances are paving the way for faster and denser random-access memory (RAM) and non-volatile memory, such as storage-class memory (SCM) and Flash memory in computing systems to address the evolving requirements of users. For example, one common type of RAM memory utilized in servers, computing systems, and other types of memory devices are dynamic random-access memory (DRAM) and synchronous DRAM (SDRAM) that are further identified by a hardware configuration, such as dual-inline memory modules (DIMMs), small outline DIMMs (SO-DIMMs), and custom-format DIMMs (CDIMMs). Some computing systems and servers are designed to operate with heterogeneous memory configurations, such as DIMMs of differing storage capacities, DIMMs of differing clock speeds, DIMMs of data-rates/bandwidths (e.g., double date rate (DDR)), technology generations (e.g., DDR3, DDR4, etc.), power variants (low power DDR3 (LP-DDR3)), etc.

Next generation workloads include evolving requirements from customers, such as high-speed memory, large capacity memory, and/or in-memory analytics or database tables. A software workload may be viewed as a self-contained unit consisting of an integrated stack consisting of applications, middleware, databases, processes, and operating systems devoted to a specific computing task. Some workloads are monolithic and can execute within a single computing system, such as a server and/or a virtual machine (VM). Other workloads, such as an e-commerce application can include of a plurality of applications and functions distributed among computing systems where various servers or VMs offer performance benefits for one type of application or function based on operating systems and/or hardware configurations corresponding to a server or VM that executes a particular application or function. In some instances, an executing workload can spawn or generate additional child workloads or sub-workloads to support the operations of the parent workload, such as a business service.

SUMMARY

According to embodiments of the present invention, there is a method, computer program product, and/or system for configuring hardware within a computing system. In an embodiment, the method includes one or more computer processors identifying information respectively associated with a plurality of hardware resources within a portion of a computing system. The method further includes determining whether a set of memory modules of differing performance ratings are operatively coupled to a shared bus fabric. The method further includes responding to determining that the set of memory modules of differing performance ratings is operatively coupled to the shared bus fabric by configuring a subsystem to selectively access respective groups of memory modules within the set of memory modules based on a performance rating corresponding to a respective group of memory modules.

DETAILED DESCRIPTION

Figure 1:
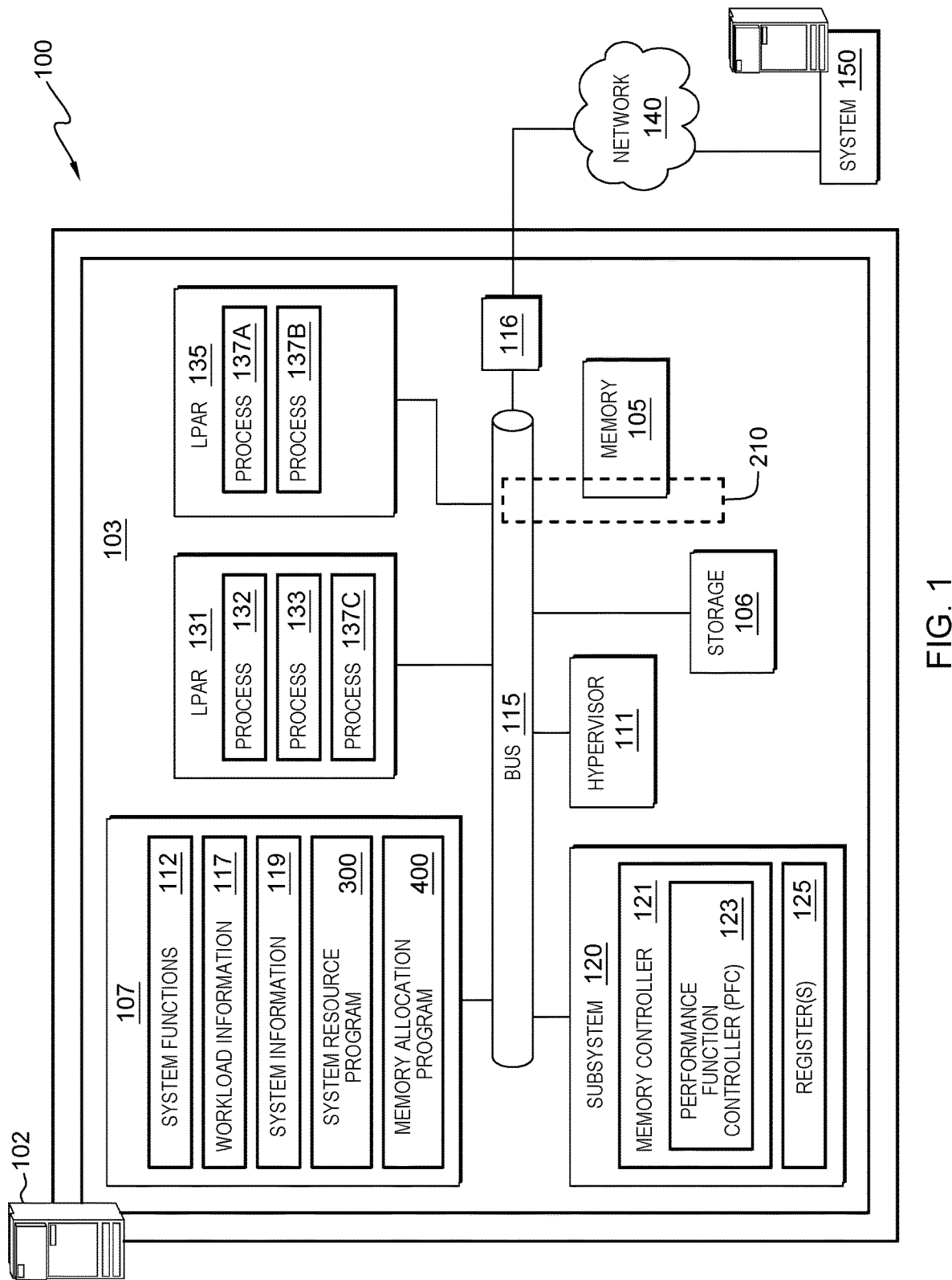
FIG. 1 illustrates a networked-computing environment, in accordance with an embodiment of the present invention.

Embodiments of the present invention recognize that the computing hardware (e.g., system racks, server drawers, blade servers, etc.) of some computing systems supports mixed memory modules (e.g., DDR3, DDR4, etc.) hardware configurations. Those skilled in the art would recognize that the term "server" used herein may be used interchangeably for a computing system, a computing node, a drawer of a system rack, a computing blade, a logical partition (LPAR), etc. without departing from the scope of the invention. Some computing hardware includes one or more buses and/or memory controllers that can acquire vital product data (VPD) corresponding to a memory module, and that ca address, access, and control individual memory modules (e.g., dual-inline memory modules (DIMMs)) and/or banks of memory modules at differing bus speeds, timings, latencies, etc. As used herein, DIMM, memory module, memory resource, and/or DDR memory may be used interchangeably with respect to memory hardware. However, specific memory types, classes, or technologies of memory modules can include additional descriptive identifiers, such as DDR3 DIMM, DDR4 DIMM or FB-DIMM.

In addition, embodiments of the present invention recognize that memory hardware may have different properties, such as DDR4 memory has a higher bandwidth than DDR3 memory and operates at a lower voltage thus consuming less power, but costs more relative to DDR3 memory. In addition, DDR4 memory is backward compatible to DDR3. However, utilizing a combination of DDR4 and DDR3 memory within the same memory subsystem (e.g., system board) applies the performance constraints of the DDR3 memory to the DDR4 memory.

Embodiments of the present invention further recognize that a workload of a user can be a singular integrated program or a workload can be a distributed entity, such as an e-commerce solution that utilizes a plurality of different programs and services that execute among differing operating systems (OSs) and may be deployed among systems and/or servers that support specialized capabilities utilized by various portions of the workload (e.g., web services, databases, computational algorithms, financial transaction processing with embedded encryption, etc.). In addition, embodiments of the present invention also recognize that middleware and various system functions that deploy a workload are unaware of the underlying memory technology of server(s) where various portions of the workload are deployed to execute.

Embodiments of the present invention recognize that some firmware and hypervisors treat the DIMMs within a computing system or a server as generic memory resources and abstract and/or virtualize memory resources for the OSs, LPARs, virtual machines (VMs), and/or containers where portions of the workload execute. In addition, an administrator of a computing system may cost and/or advertise metrics of the computing system based on a generalized performance capability associated with system memory. Determining cost/performance tradeoffs could be a complex analysis, especially in cloud-computing infrastructures, where heterogenous memory resources can occur, but where various system planar/riser cards are periodically refreshed or upgraded to include memory modules of advanced capabilities. Further, embodiments of the present invention recognize that various as-a-service capabilities enable administrators of some computing infrastructures to activate additional memory resources on a temporary basis. However, in various instances, only the storage capacity is known for selectively activated memory resources, and the underlying technology is unknown.

Embodiments of the present invention utilize middleware, system functions, and/or firmware to identify the different memory resources and corresponding characteristics within a computing system and/or a server. Memory "rating" as used herein is an abstraction associated with a given memory technology or operations characteristic, such as increased bandwidth and is associated with a relative performance benefit. For example, DDR4 memory has a higher rating than DDR3 memory, as such, utilizing DDR4 memory provides a performance improvement relative to DDR3 memory, especially in association with memory-intensive activities. In addition, embodiments of the present invention enable an administrator of a computing system to more granularly price resource allocations by identifying memory resources of differing memory ratings and dictates associated with a distribution of memory ratings for a given workload.

Embodiments of the present invention also determine which buses (e.g., data channels, interconnect fabrics, etc.) are associated with memory control hardware or subsystems (e.g., memory controllers, base address registers (BARs), etc.). Embodiments of the present invention determine whether one or more groups of DIMMs that can be selectively addressed by different portions of a bus (e.g., a multi-channel memory architecture, fabric) and/or accessed via memory interleaving. Various embodiments of the present invention are applied during a boot sequence or an initial program load (IPL) of a computing system, computing subsystem, or server.

Further embodiments of the present invention can determine whether programmable memory controls are included: on a printer circuit board (PCB), within a multi-core processor module, and/or within a multi-core processor circuit chip. As such, embodiments of the present invention can "inform" a hypervisor of which types of memory hardware, processor cores, and corresponding memory control subsystems are operatively linked to ensure that during virtualization, memory resources can be: traced (e.g., mapped), properly configured for the corresponding memory-rating, and dynamically allocated or reallocated. In one scenario, a multi-core processor module may include two or more memory control subsystems operatively coupled to respective groups of processor cores within one or more processor chips. In another scenario, a multi-core processor chip may include various integrated functions within different sections of the chip. In an example, a memory controller, one or more performance function controllers (PFCs), and corresponding BARs are included within each quadrant of the 16-core processor chip are operatively coupled to a respective set (e.g., group) of four processor cores within each quadrant. PFCs enable operational differentiation (e.g., differing bandwidths) between memory modules based on functional characteristics or performance characteristics of individual or banks of DIMMs as opposed to operating at a reduced level of performance based on characteristics associated with other memory modules within a system or a server.

Some embodiments of the present invention can be implemented by upgrading one or more memory control subsystems (e.g., memory controllers, BARs, etc.) to include newer hardware, such as PFCs and/or advanced memory controller that can more granularly address memory modules, and calibrate (e.g., tune) a memory bus and respective registers to selectively access (e.g., interface) memory resources of differing memory-ratings. Alternatively, some embodiments of the present invention can be implemented within one or more multi-core processor modules of a server by integrating (e.g., incorporating) multiple PFCs within the architecture of the multi-core processor.

Various embodiments of the present invention can be applied to other elements of a computing system that include memory control and/or processor-like functions, such as Input-Output memory management units (IOMMUs), adapter cards with field-programmable gate arrays (FPGAs), and/or graphics processing units (GPUs) that can perform direct-memory access (DMA) of system memory without utilizing a memory control subsystem related to the processors of the system. Similarly, some accelerator cards have on-card memory behind the FPGA. As such, an embodiment of the present invention can tune a PFC of a processor that accesses the accelerator card via a different communication fabric, such as a coherent accelerator processor interface (CAPI) to directly access the on-card memory based on the type of memory installed on the accelerator card. Alternatively, or in addition to a system processor directly accessing on-card memory, another embodiment of the present invention can respond to a user modifying or upgrading memory of the accelerator card by modifying parameters associated with on-card PFC within and FPGA or GPU to selectively access and utilize on-card memory based on the ratings of memory installed on the accelerator card.

The present invention will now be described in detail with reference to the Figures. FIG. 1 is a functional block diagram illustrating networked-computing environment 100, in accordance with embodiments of the present invention. In an embodiment, networked-computing environment 100 includes: one or more instances of system 102 and system 150, all interconnected over network 140. In some embodiments, networked-computing environment 100 includes multiple instances of computing subsystem 103 within an instance of system 102. Many modifications to the depicted environment may be made by those skilled in the art without departing from the scope of the invention as recited by the claims.

System 102 and system 150 may be: laptop computers, tablet computers, netbook computers, personal computers (PC), desktop computers, personal digital assistants (PDA), smartphones, wearable devices (e.g., digital eyeglasses, smart glasses, smart watches, personal fitness devices, etc.), or any programmable computer systems known in the art. In certain embodiments, system 102 and system 150 represent computer systems utilizing clustered computers and components (e.g., database server computers, application server computers, storage systems, network routers, etc.) that act as a single pool of seamless resources when accessed through network 140, as is common in data centers and with cloud-computing applications. In general, instance of system 102 and system 150 are representative of any programmable electronic device or combination of programmable electronic devices capable of executing machine readable program instructions and communicating via network 140. System 102 and system 150 may include components, as depicted and described in further detail with respect to FIG. 5, in accordance with embodiments of the present invention.

In one embodiment, an instance of system 102 includes two or more instances of computing subsystem 103. Instances of computing subsystem 103 may be representative of: a system planar board, a drawer of a system rack, a blade server within a rack, and/or a computing node that includes a plurality of hardware components. In general, instances of computing subsystem 103 are representative of any programmable electronic device or combination of programmable electronic devices capable of executing machine readable program instructions and communicating among one or more other instances of computing subsystem 103 within the instance of system 102 via an instance of interconnect technology 116. Other instances of computing subsystem 103 may include: a computing node, a server drawer, and/or single card blade-servers within a card cage. In various embodiments, system 102 includes one or more instances of computing subsystem 103 that are main system planar PCBs that includes instances of interconnect technology 116 to interface and communicate with different instances of computing subsystem 103, such as server drawers. An instance of computing subsystem 103 may include components, as depicted and described in further detail with respect to FIG. 5, in accordance with embodiments of the present invention.

In some embodiments, an instance of system 102 is representative of a larger system or single computing node that includes one instance of computing subsystem 103. An instance of computing subsystem 103 may include, but is not limited to: one or more instances of bus 115, hypervisor 111, memory 105, storage 106, system storage 107, interconnect technology 116, one or more instances of subsystem 120, and a plurality of other hardware resources (not shown), such as computer processors, multi-core processor modules, network interfaces, Input/Output (I/O) interfaces, adapter cards, hardware accelerators, etc. In an embodiment, system storage 107 is representative of one or more persistent storage devices that store programs and information related to an instance of system 102 and may be access restricted (e.g., system administrators, an instance of hypervisor 111, and/or programs with root privileges). In addition, system 102 may host a plurality of LPARs, such as LPAR 131 and LPAR 135 provisioned from computing resources of system 102 and/or an instance of computing subsystem 103, such as memory 105, storage 106, and the plurality other hardware resources (not shown).

In various embodiments, system 102 includes a plurality of instances of computing subsystem 103. In various embodiments, system 102 includes hypervisor 111 and shares access to an instance of system storage 107 and associated software and data with each instance of computing subsystem 103. In an embodiment, an instance of computing subsystem 103 includes respective instances of memory 105, storage 106, one or more instances of bus 115, interconnect technology 116, one or more instances of subsystem 120, one or more computer processors (e.g., chips, modules, etc.) and/or multi-core processor modules, and other computing hardware (not shown). In addition, an instance of computing subsystem 103 includes at least one instance of sub-environment 210 (described in further detail with respect to FIG. 2).

In an embodiment, memory 105 is representative of a plurality of memory modules of one or more storage capacities, memory types, and/or technologies (e.g., performance characteristics). Characteristics associated with memory modules of a given technology or capability may include: column access strobe (CAS) latency values, power utilization based on operational parameters (e.g., clock speed, voltage, etc.), bus/address width, bandwidth values (e.g., maximum data transfer rate), rates of data transfer, etc. For example, memory 105 within an instance of computing subsystem 103 may include a plurality of memory modules that include: DDR3 DIMMs, DDR4 DIMMs, and/or SCM DIMMs. In one embodiment, hypervisor 111 allocates memory resources within memory 105 to one or more LPARs within computing subsystem 103. In various embodiments, hypervisor 111 maps the memory hardware into memory addresses that are subsequently virtualized and/or assigned to an LPAR. In some embodiments, physical memory (e.g., DIMMs) within memory 105 is controlled and accessed by subsystem 120 over one or more portions of bus 115 (described in further detail with respect to FIG. 2).

Storage 106 is representative of a plurality of persistent storage devices (e.g., flash drives, disk drives, tape drives, etc.). In one embodiment, storage 106 is representative of persistent storage associated with an instance of computing subsystem 103 that is accessible via a respective instance of bus 115. In another embodiment, storage 106 is representative of persistent storage distributed within system 102. In some embodiments, one or more devices of storage 106 are utilized to provide virtual paging space for one or more processes.

In an embodiment, system storage 107 is representative of a subset of persistent storage devices included within storage 106. In another embodiment, system storage 107 is representative of one or more persistent storage devices different from the persistent storage devices of storage 106. In various embodiments, system storage 107 includes: system functions 112, workload information 117, system information 119, system resource program 300, memory allocation program 400, and various programs and databases (not shown), such as a user/web interface, application programming interfaces (APIs), device drivers, code libraries, operating systems, communication protocols, etc. System storage 107 may also include hardware page tables (not shown) generated by an instance of hypervisor 111 that maps physical memory (e.g., memory addresses) within an instance of memory 105 to logical memory blocks (LMBs) that are allocated to LPARs within a respective instance of computing subsystem 103 and/or segment tables (not shown) associated with virtual address space related to a respective LPAR.

System functions 112 include: a system management utility, a load balancer, a statistical analysis tool, and one or more monitoring functions for system 102 and/or one or more subsystems, etc. System functions 112 may also include a visualization program, one or more licensed internal code (LIC) programs, functions that monitor the resources and performance of various processes and workloads executing within networked-computing environment 100, etc. In an example, system functions 112 include a visualization program that enables a user or an administrator to obtain a visual representation of a workload, to obtain a distribution of the processes associated with the workload (e.g., node locations, LPARs, VMs, containers, etc.), and/or to access metadata or links that indicate characteristics of a process and/or resources respectively assigned to each process of the workload. In an embodiment, system functions 112 include a reallocation agent, function, and/or daemon that swaps (e.g., freezes, copies, and releases) memory allocations among processes and/or LPARs to modify the allocations of memory resources based on memory-rating (e.g., performance rating) information.

In some embodiments, one or more aspects of system functions 112 interface with hypervisor 111 to periodically poll, aggregate, compile, and/or verify information included within system information 119. In other embodiments, system functions 112 deploy software daemons among instances of computing subsystem 103 and/or each node within an instance of system 102 to periodically determine monitoring information associated with executing workloads and related processes. The monitoring information and/or an analysis of the monitoring information associated with a workload is aggregated within workload information 117. System functions 112 can obtain monitoring information at the OS level or at the LPAR level. In some scenarios, monitoring information obtained via system functions 112 is utilized by memory allocation program 400 to improve the performance of one or more executing workloads. In other scenarios, workload monitoring information obtained via system functions 112 is utilized to improve the performance of subsequent executions of a workload.

Workload information 117 includes various elements, such as tables, databases, etc., that store information associated with a plurality of workloads that execute within networked-computing environment 100. In an example, workload information 117 includes a list of processes, services, and/or applications utilized by or comprising a workload. In one embodiment, workload information 117 includes information related to a plurality of currently executing workloads and historic information related to prior executions of the workloads, such as memory user average transaction time per unit of allocated memory, I/O operations (e.g., read and write traffic) per unit time for storage and/or memory utilization, a computation rate, etc. In addition, workload information 117 may include various user preferences, dictates (e.g., cost or security constraints, priority, etc.), and/or other determinations associated with a workload.

In various embodiments, information within workload information 117 includes cross-references and/or links to information within system information 119. In an embodiment, information associated with a current workload within workload information 117 includes: provisioning information associated with a plurality of computing and/or hardware resources for allocation to a workload; an ID for an instance of the workload; a set of IDs corresponding to the processes (e.g., distinct or shared) utilized the workload; an ID corresponding to each LPAR that hosts one or more processes, containers, or applications related to the workload; resources allocated to respective LPARs of the workload, monitoring information corresponding to one or more portions of the workload, user preferences associated with the workload, etc. Hardware and/or computing resources of system 102 allocated to aspects of the workload, such as an LPAR, a container, and/or a process may be further described with respect to a quantity of allocated of memory resources, a distribution of the memory-ratings of the allocated memory resources, LMB information, processors allocations, persistent storage allocations, virtual page space allocation within storage 106, etc.

In some embodiments, workload information 117 further includes a profile log corresponding to a workload. A profile log associated with a workload includes information obtained from system functions 112 such as memory read/write requests traffic rates, and an amount of memory utilized. Other aspects of a workload profile can be determined with respect to an operational level (e.g., the OS or the LPAR). Profiling of a workload may also include weightage values and threshold values associated with memory resources identified by a user. In one example, weightage values can be based on an overall analysis of a workload that is associated with a distribution of memory resources based on memory-ratings that are allocated to a workload. In another example, weightage values can represent a set of memory resource distributions and corresponding performance values for a workload based on each memory-rating based distribution of memory resources. In a further example, other weightage values can be representative of memory resources allocated at the LPAR-level, such as 30% DDR4 memory and 70% DDR3 memory. In addition, some weightage values may be utilized to compare different workloads in response to identifying a contention among the different workloads for allocations of performance-enhancing (i.e., performance-improving) memory resources. In an example, a 2 GB reallocation of performance-enhancing from a first workload only decreases performance by 5%; however, reallocating the 2 GB of performance-enhancing to a second workload generates a 15% performance improvement associated with the second workload.

In an embodiment, threshold values related to a workload profile stored in workload information 117 are associated with criteria that further affect distributions of memory resources and/or responses to distributions of memory resources. In one example, a first threshold value for a workload of 70% may indicate that if at least 70% of the requested performance-enhancing memory is allocated, then the workload can execute without a reallocation of memory resources during execution. In another example, threshold values may be user defined or can be determined, statically, dynamically, as a power-on feature, or as dictate of system 102 for one or more workloads. Based on the characteristics associated with the memory resources (e.g., modules) and profile information associated with a workload, workload information 117 may further include a ranking associated with each process of a workload, thereby identifying a cutoff value associated with determining which processes of a workload are assigned to memory resources of differing memory-ratings. The identified cutoff value is further affected by the amount or weightage associated with each memory resource of a corresponding memory-rating of each process and LPAR utilized by the workload.

System information 119 includes a plurality of information related to the hardware resources of system 102 and/or the hardware resources of respective instances of computing subsystem 103. In an embodiment, system information 119 may include, but is not limited to, hardware page tables, segment tables, IDs, VPD, hardware definitions (e.g., capabilities, technical specifications, etc.), and locations associated with each hardware element within a computing system or subsystem. System information 119 also includes parameters and other calibration information utilized to tune instances of PFC 123 based on characteristics (e.g., memory-rating) of memory resources within memory 105. System information 119 further includes memory-rating information corresponding to the plurality of memory resources within memory 105. System information 119 may also include cross-reference information associated with hardware elements, such as processor/core IDs, instances of bus 115, instances of subsystem 120, and portions of memory 105 that are operatively coupled (e.g., connected), and thereby dictating one or more constraints (e.g., limitations) associated with combinations of hardware resource assignments.

In one embodiment, a portion of system information 119 is dynamically determined during a boot sequence or an IPL of one or more portions of a system 102 by an instance of hypervisor 111 by obtaining VPD associated with the hardware resources of the booted or IPL'ed portion of system 102. In another embodiment, some portions of system information 119 are obtained during the operation of system 102 and/or instances of computing subsystem 103 utilizing hypervisor 111. In some embodiments, system information 119 includes performance information associated with one or more hardware elements based on information generated by one or more aspects of system functions 112. In various embodiments, system information 119 includes calibration (e.g., tuning) and control information for one or more instances of subsystem 120 and related instances of PFC 123 and corresponding instances of register(s) 125.

System resource program 300 is a program that configures memory resources of one or more portions of system 102 based on the capabilities of system 102 or a respective instance of computing subsystem 103; and characteristics and locations of respective computing resources, such as memory hardware and computer processors/processor modules/cores. In addition, system resource program 300 determines constraints related to the computing resources, which can affect the calibration of one or more memory subsystems and/or buses based on a combination of the characteristics, locations, and constraints related to the computing resources. In an embodiment, system resource program 300 utilizes information associated with system 102 to determine the parameters utilized by instances of subsystem 120 to tune elements of subsystem 120, and selectively access and utilize groups of memory resources within memory 105 based on the respective memory-ratings corresponding to the memory resources.

In various embodiments, system resource program 300 also analyzes the utilization of memory resources and other metrics related to workloads that execute on system 102 or one or more servers associated with system 102. In some embodiments, system resource program 300 further determines, based on various analyses of a workload, which portions (e.g., LPARS, processes, containers, etc.) of the workload would experience a performance improvement based on utilizing a distribution of memory resources of differing memory-ratings (e.g., performance ratings). In an example, system resource program 300 determines that a computationally-intensive process of a workload accessing a large in-memory set of files will experience a performance improvement by utilizing memory of a higher rating. In another example, system resource program 300 determines a group of operations of a workload within the same LPAR that are analyzed during execution to determine the resource utilization (e.g., memory, disk I/O rates, network I/O operation rates, etc.) to further determine a rating-based distribution of memory resources that are allocated to future instances of the LPAR in response to executing the workload. Information and analyses generated by the system resource program 300 are included and/or updated within workload information 117.

Memory allocation program 400 is a program that identifies information and analyses related to a workload and determines, based on available memory resources within a computing system, a set of memory resources of differing memory-ratings to allocate to various aspects of a workload prior to executing the workload. Memory allocation program 400 may reallocate memory based on LMBs or another unit of memory allocation. In one embodiment, memory allocation program 400 is a program that identifies information and analyses related to a workload and determines, based on available memory resources within system 102, a set of memory resources of differing memory-ratings to allocate to various aspects of a workload to improve the performance of the workload. In another embodiment, if memory allocation program 400 determines sufficient memory resources of a particular memory-rating are not available for allocation, then memory allocation program 400 allocates memory among processes of a workload based on the available memory resources and one or more user preferences.

In some embodiments, memory allocation program 400 analyzes other workloads executing within system 102 to determine whether higher-rated memory resources are underutilized by another workload. Memory allocation program 400 reallocates the underutilized higher-rated memory resources to one or more aspects of an initiating workload that would experience (e.g., exhibit) a performance improvement from the higher-rated memory resources. In other embodiments, memory allocation program 400 monitors system 102 for changes and reallocates released higher-rated memory resources to one or more active processes. In a further embodiment, memory allocation program 400 can utilize priority information associated with various workloads to modify a distribution and allocation of resources within memory 105 and virtual page space assigned within storage 106 to improve (e.g., enhance) the execution of a portion (e.g., one or more processes) of a high priority workload.

In one embodiment, each instance of computing subsystem 103 includes a corresponding instance of hypervisor 111 to control and virtualize the hardware resources within a respective instance of computing subsystem 103. Information associated with virtualized hardware resources is included within instances of system information 119. In various embodiments, other information obtained by hypervisor 111 is utilized to update instances of system information 119. In another embodiment, hypervisor 111 provides system functions 112 additional information for inclusion within workload information 117, such as LPAR IDs associated with a workload, memory resource allocation by memory-rating, processor/core IDs corresponding to allocated cores, memory page table information, etc. In some embodiments, hypervisor 111 updates one or more memory page tables with additional information that indicates the memory-ratings corresponding to physical memory addresses and/or LMBs. If hypervisor 111 determines that memory resources of differing memory-ratings cannot be selectively addressed by an instance of bus 115, then hypervisor 111 assigns a lower memory-rating to the memory resources unless lower-rated memory resources are deactivated and/or excluded from use.

In one embodiment, bus 115 is representative of one or more physical buses or other architectures that enable communications, control information, and data transfer among a plurality of hardware resources of system 102 and/or among hardware resources of an instance of computing subsystem 103. In some scenarios, bus 115 may be included within PCB's (not shown), such as system planar boards, backplanes, server mother board, etc., of system 102 and/or one or more instances of computing subsystem 103. In other scenarios, one or more instances of bus 115 may be representative of other communication and control fabric technologies, such as fiber optic cables and/or wiring harnesses.

Figure 2:
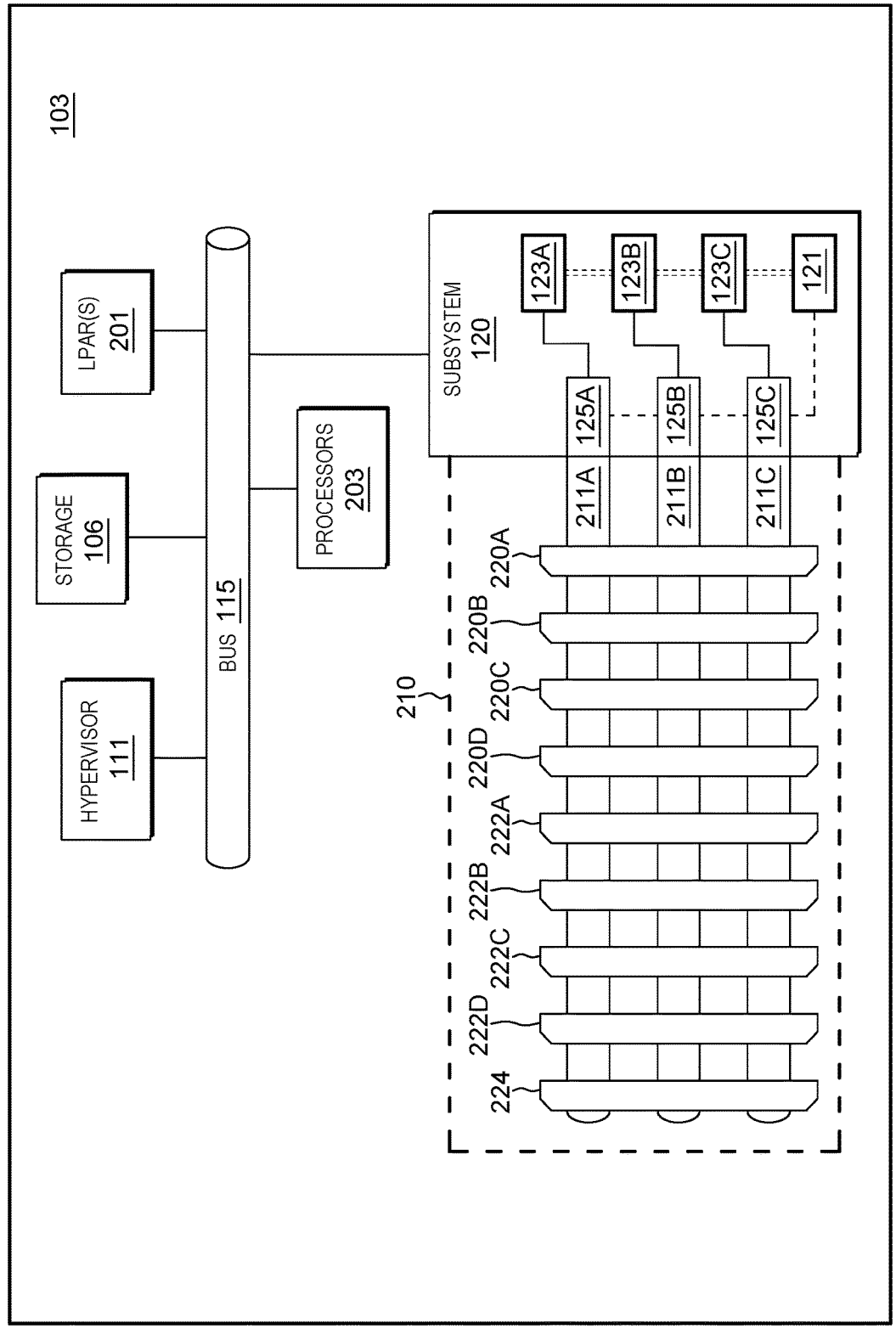
FIG. 2 depicts an illustrative example of a portion of a computing system associated with configuring memory resources, in accordance with an embodiment of the present invention.

In another embodiment, an instance of computing subsystem 103 can include multiple instances of bus 115 that operatively couple a subset of hardware resources of computing subsystem 103 (described in further detail with respect to FIG. 2). In some embodiments, an instance of bus 115 includes a plurality of data/communications channels that are accessible by some hardware resources but not accessible by other hardware resources. In an example, I/O cards utilized to access devices within storage 106 may be accessible by any processor/core of computing subsystem 103. However, a group of DIMMs within memory 105 may be restricted to processors/cores operatively coupled to a specific instance of subsystem 120 that controls the group of DIMMs. In other embodiments, an instance of computing subsystem 103 may include two or more duplicate instances of bus 115 (e.g., parallel bus structures) that can be dynamically configured to operatively link various hardware resources of computing subsystem 103.

In some embodiments, interconnect technology 116 is representative of one or more components that enable two or more instances of computing subsystem 103, within an instance of system 102, to interface and communicate. In one example, interconnect technology 116 is representative of one or more wiring harnesses (e.g., electrical cables, fiber-optic cables, etc.) that connect among at least two instances of computing subsystem 103. In another example, interconnect technology 116 is representative of a passive backplane (e.g., an interconnect PCB with minimal computational capabilities) that the instances of computing subsystem 103 utilize to interface and communicate via one or more pluggable interfaces (e.g., edge connectors, sockets, etc.), one or more wiring harnesses, or a combination thereof. In various embodiments, interconnect technology 116 is representative of a plurality of electrical and/or optical interfaces of a system planar board that interfaces and communicates with two or more instances of computing subsystem 103 within an instance of system 102. In another embodiment, an instance of interconnect technology 116 enables system 102 to interface with network 140.

Subsystem 120 is representative of a system and/or a set of devices utilized to control, access, and communicate data within memory resources included in memory 105 to and from various components of computing subsystem 103. In an embodiment, subsystem 120 includes one or more instances of memory controller 121, one or more instances of PFC 123, and one or more instances of register(s) 125. In one embodiment, subsystem 120 is included on a PCB (not shown) of computing subsystem 103 external to one or more computer processors or multi-core processor modules (not shown). In some embodiments, one or more elements of subsystem 120 are included within a multi-core processor module and operatively couple (e.g., connect) one or more processors or multi-core processor chips (not shown) of the processor module. In other embodiments, one or more elements of subsystem 120 are functions integrated within a multi-core processor chip. In other embodiments, instances of memory controller 121, PFC 123, and/or register(s) 125 are dynamically configured among cores within a multi-core processor chip (not shown) based on a programmable network-on-a-chip architecture. In a further embodiment, instances of PFC 123 may include aspects of system resource program 300 and/or memory allocation program 400 integrated as firmware.

In an embodiment, memory controller 121 includes functions to translate virtual memory addresses to physical addresses, control caching, bus arbitration, refresh DRAM, multiplex memory read/write access, etc. In addition, memory controller 121 can control the flow of data among registers(s) 125, (i.e., BARs), memory modules, processors, and other components, such as network cards. In some embodiments, memory controller 121 is a separate component of subsystem 120. In other embodiments, one or more instances of memory controller 121 are integrated within a processor or multi-core processor chip. In a further embodiment, a portion of functions of memory controller 121 are distributed between on-processor functions and included within a buffer chip on DIMMs of various technologies.

Performance function controller (PFC) 123 is utilized for delay calibration, tuning, and functional path selection for at least two of instances of registers(s) 125 utilized by respective groups of memory resources (e.g., memory of the same rating). In an example, information such as write latencies, read latencies, bus widths, cycle times, etc., corresponding to groups of DIMMs are utilized to determine various calibration parameters utilized by a respective of PFC 123. In an embodiment, an instance of PFC 123 controls a respective set of register(s) 125. In another embodiment, each instance of register(s) 125 is operatively coupled to a corresponding instance of PFC 123. In some embodiments, one or more instances of PFC 123 are integrated within memory controller 121. In various embodiments, instances of register(s) 125 are representative of a plurality of sets of BARs associated with processors within system 102.

LPAR 131 and LPAR 135 are representative of two LPARs of a plurality of LPARs provisioned within system 102 to support the execution of a plurality of workloads within various portions of system 102. In one embodiment, LPAR 131 and LPAR 135 execute within the same instance of computing subsystem 103. In an embodiment, processes 137A, 137B, and 137C are representative of processes of a first workload; process 132 and process 133 are respectively associated with a second and a third workload different from the first workload.

In one embodiment, system 102 communicates through network 140 to system 150. Network 140 can be, for example, a local area network (LAN), a telecommunications network, a wireless local area network (WLAN) (e.g., an intranet), a wide area network (WAN), the Internet, or any combination of the previous and can include wired, wireless, or fiber optic connections. In general, network 140 can be any combination of connections and protocols that will support communications between system 102 and system 150, in accordance with embodiments of the present invention. In another embodiment, network 140 operates locally via wired, wireless, or optical connections and can be any combination of connections and protocols (e.g., personal area network (PAN), laser, infrared, ultrasonic, etc.).

In an embodiment, system 150 is representative of one or more other nodes and/or servers within networked-computing environment 100. In another embodiment, system 150 is representative of one or more other instances of system 102.

FIG. 2 depicts an illustrative example of environment 200, which is representative of a portion of an instance of computing subsystem 103 and sub-environment 210, in accordance with an embodiment of the present invention. In an example embodiment, environment 200 includes storage 106, hypervisor 111, an instance of bus 115, one or more instances of subsystem 120, LPAR(s) 201, processors 203, and sub-environment 210. Storage 106 also includes one or more elements previously discussed with respect to FIG. 1, system storage 107.

In an example, LPAR(s) 201 are representative of various aspects of a workload that execute within an instance of computing subsystem 103, such as LPAR 131 and LPAR 135 previously discussed with respect to FIG. 1. LPAR(s) 201 may include a plurality of processes or services respectively associated with two or more workloads, such as processes 132 of a first workload, process 133 of a second workload, and processes 137A, 137B, and 137C of a third workload.

In an illustrative embodiment, the depicted instance of subsystem 120 includes respective instances memory controller 120; PFCs 123A, 123B, and 123C; and registers 125A, 125B, and 125C. In an embodiment, memory controller 121 interfaces with PFC 123A, PFC 123B, and PFC 123C to communicate (double-dashed line) parameters and calibration information respectively associated with tuning memory channels 211A, 211B, and 211C based on the memory-ratings corresponding to the subset of DIMMs of memory 105 that are included in sub-environment 210.

In an example, sub-environment 210 is representative of a portion of bus 115 and of a subset of memory resources (e.g., DIMMs) within a respective instance of memory 105 (previously depicted with respect to FIG. 1). Sub-environment 210 includes: a first group of DIMMs represented by DIMMs 220A, 220B, 220C, and 220D; a second group of DIMMs represented by represented by DIMMs 222A, 222B, 222C; and 222D, and a third DIMM represented by DIMM 224. Sub-environment 210 also includes memory channels 211A, 211B, and 211C. In an embodiment, memory channels 211A, 211B, and 211C are representative of configurable fabric associated with bus 115 and are utilized to control access to the DIMMs associated with sub-environment 210 and transfer data utilized by one or more processors of processors 203 associated with executing one or more aspects of workloads executing within the instance of computing subsystem 103. Memory controller 121 manages the flow of data (dashed line) to and from registers 125A, 125B, and 125C among the DIMMs of sub-environment 210 and/or processors 203 to support one or more workloads associated with LPAR(s) 201.

In one embodiment, system resource program 300 utilizes hypervisor 111 to determine the number, type, and operational characteristics of each DIMM within sub-environment 210. In response, system resource program 300 determines that the first group of DIMMs are DDR3 DIMMs, the second group of DIMMs are DDR4 DIMMs, and DIMM 224 is a SCM memory module (discussed in further detail with respect to FIG. 3, step 302). Further, system resource program 300 may determine that sufficient memory channels are available within bus 115 to selectively access each type of DIMM within sub-environment 210 based on a respective memory-rating. System resource program 300 can also determine that the instance of subsystem 120 operatively coupled to sub-environment 210 includes at least three respective instances of PFC 123 and at least three instances of register(s) 125. As such, system resource program 300 can control and calibrate subsystem 120 to selectively access each type of DIMM within sub-environment 210 and enable each type of DIMM to operate (e.g., send and receive data) based on design capabilities, such as a higher bandwidth as opposed to operating in a compatibility mode at reduced capabilities, such as DDR4 memory operating in DDR3 mode (discussed in further detail with respect to FIG. 3, step 304).

Figure 3:
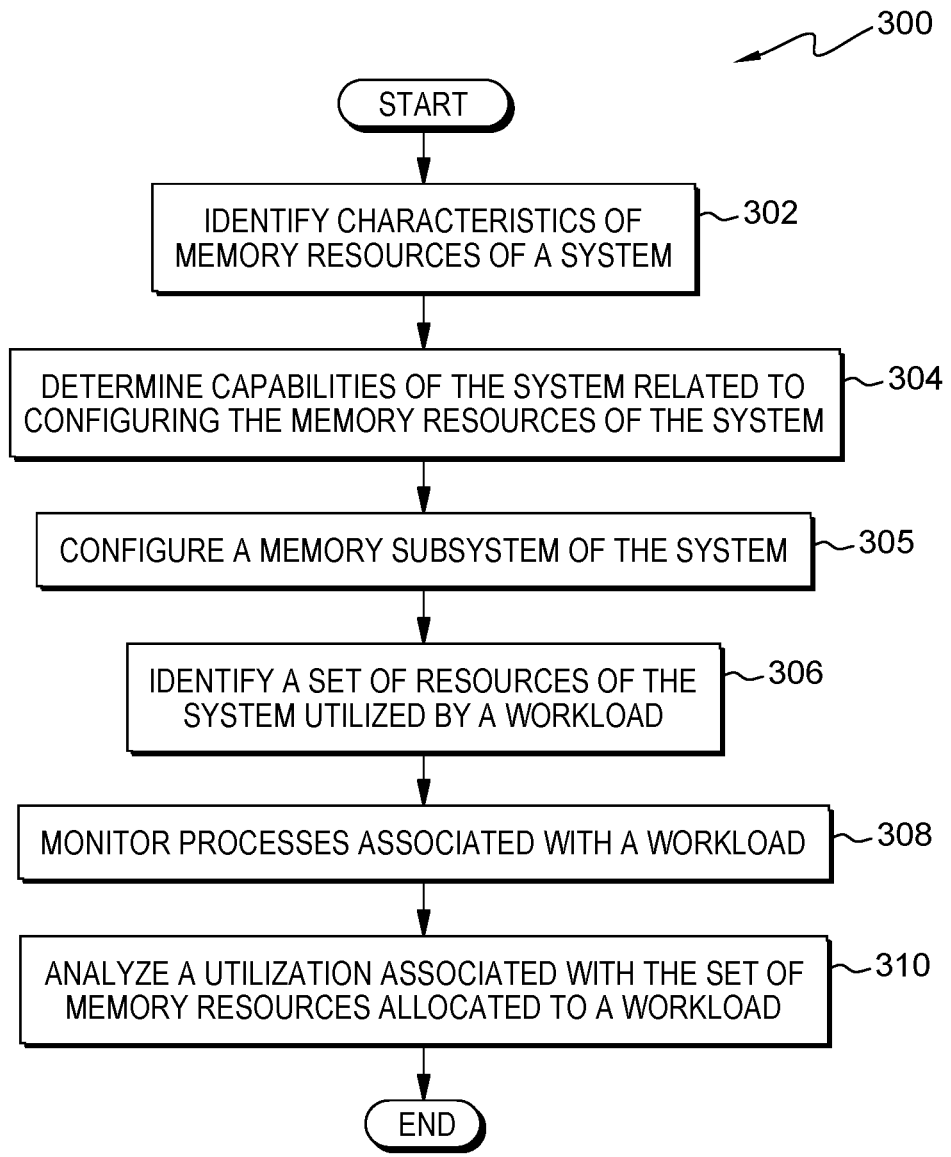
FIG. 3 depicts a flowchart of the operational steps of a system resource program, in accordance with an embodiment of the present invention.

In one embodiment, system resource program 300 can download calibration and tuning information from system information 119 to configure subsystem 120 (discussed in further detail with respect to FIG. 3, step 305). In the current example, system resource program 300 configures PFC 123A and register 125A to support DDR3 memory and operatively couples register 125A to memory channel 211A. Similarly, system resource program 300 configures PFC 123B and register 125B to support DDR4 memory and operatively couples register 125B to memory channel 211B. In addition, system resource program 300 configures PFC 123C and register 125C to support SCM memory and operatively couples register 125C to memory channel 211C.

Figure 4:
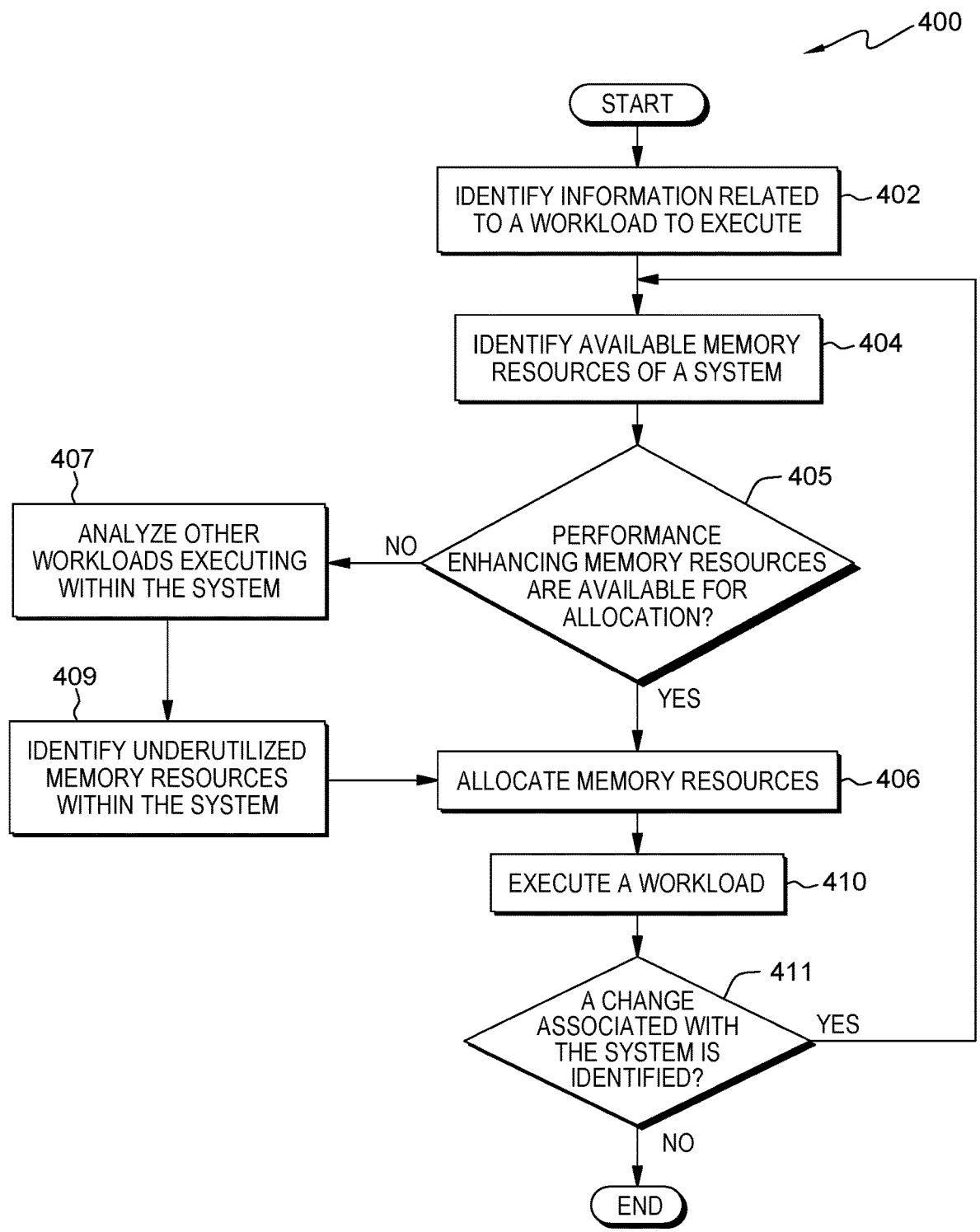
FIG. 4 depicts a flowchart of the operational steps of a memory allocation program, in accordance with an embodiment of the present invention.

In another embodiment, in response to system resource program 300 configuring subsystem 120, memory allocation program 400 can selectively allocate and/or reallocate memory resources within sub-environment 210, among the workloads and processes associated with LPAR(s) 201 (discussed in further detail with respect to FIG. 4, step 406).

In an example, LPAR 131 is configured as a virtual I/O server (e.g., VIOS partition) utilized by a plurality of workloads that execute on system 102. In response to computing subsystem 103 IPL'ing, hypervisor 111 instantiates LPAR 131 prior to any workloads utilizing LPAR 131 for network communications. LPAR 131 is not associated with a workload profile within workload information 117; therefore, hypervisor 111 may perform a random allocation of memory resources from among the DIMMs of sub-environment 210, such as DIMMs 220D, and 222A, and 222C.

In response to initiating a first workload (not shown), hypervisor 111 assigns a first quantity of memory of DIMM 222A to process 132, such as a device driver associated with a first workload. DIMM 222A utilizes less power than DIMM 220D based on a power saving preference set for computing subsystem 103. In one scenario, hypervisor 111 preferentially assigns processes to DIMMs 222A or 222C of LPAR 133 if other dictates are not invoked. Subsequently, hypervisor 111 assigns a second quantity of memory of DIMM 222A to process 133, such as a device driver associated with executing a second workload (not shown).

In a first example embodiment, in response to a request to execute at least a portion of a third workload (e.g., processes 137A, 137B, and 137C) within computing subsystem 103, memory allocation program 400 identifies information related to the third workload (discussed in further detail with respect to FIG. 4, step 402). Based on a workload profile within workload information 117, memory allocation program 400 determines that process 137C is a device driver that can execute within a VIOS partition (LPAR 131) and that processes 137A and 137B execute in an unshared partition, as depicted in LPAR 135. In addition, the provisioning configuration for LPAR 137 dictates a quantity of memory equivalent to 2.5 DIMMs of memory capacity. Memory allocation program 400 further determines that each process of the third workload (e.g., processes 137A, 137B, and 137C) are high-priority, high-bandwidth processes that preferentially utilize DDR4 memory.

In the current example, memory allocation program 400 determines that only 2.0 DIMMs of equivalent DDR4 memory capacity are unallocated (discussed in further detail with respect to FIG. 4, step 404). DIMMs 222B and 222D are available for allocation to LPAR 137. In response, memory allocation program 400 proceeds along the "No" branch of decision step 405 to identify underutilized memory resources within computing subsystem 103 (discussed in further detail with respect to FIG. 4, steps 407 and 409). In the current example, memory allocation program 400 determines that LPAR 131 includes DDR4 memory and at least one full DIMM of memory capacity is provisioned but not utilized (e.g., memory not assigned to one or more processes). In response, memory allocation program 400 interfaces with hypervisor 111 to reallocate DIMM 220C to LPAR 131 and release DIMM 222C for allocation (e.g., provisioning) to LPAR 137 (discussed in further detail with respect to FIG. 4, step 406).

Continuing with the current example, memory allocation program 400 previously identified that process 137C can execute within LPAR 131 and is a high-priority, high-bandwidth process that preferentially utilizes DDR4 memory. If memory allocation program 400 determines that sufficient memory capacity to support process 137C is unassigned within DIMM 222A, then memory allocation program 400 assigns a third quantity of memory of DIMM 222A to process 137C. However, if memory allocation program 400 determines that process 137C requires more memory capacity than remains within DIMM 222A, then memory allocation program 400 utilizes a swap function included within system functions 112 to migrate one or both of processes 132 and 133 to DIMM 220D based on various criteria, such as priority and/or memory capacity requirements. In response to releasing sufficient memory capacity from within DIMM 222A to solution the memory required for process 137C, memory allocation program 400 assigns (e.g., allocates) memory capacity within DIMM 222A to process 137C.

In addition, memory allocation program 400 updates workload information 117 and/or system information 119 with the modified memory allocations and assignments for the processes associated with the first workload, the second workload, and the third workload that execute within computing subsystem 103.

FIG. 3 is a flowchart depicting operational steps for system resource program 300, that identifies characteristics of the memory of a computing system and configures memory resources of one or more portions of the computing system and/or one or more servers of the computing system based on the capabilities of the computing system, in accordance with embodiments of the present invention. In some embodiments, multiple instances of system resource program 300 execute concurrently to identify and monitor different instances of computing subsystem 103 within an instance of system 102. In another embodiment, one or more instances of system resource program 300 can execute concurrently and/or interfaces with one or more instances of memory allocation program 400.

In step 302, system resource program 300 identifies characteristics of memory resources of a system. In one embodiment, system resource program 300 identifies characteristics of memory resources of a system by accessing system information 119 to obtain previously identified characteristics of the memory resources of one or more portions of system 102, such as an instance of computing subsystem 103. In another embodiment, system resource program 300 interfaces with hypervisor 111 to identify VPD (e.g., characteristics) of memory resources of a system based on accessing one or more flash devices (not shown) of system 102, such as a serial electrically erasable programmable read-only memory (SEEPROM) associated with one or more banks of memory hardware (e.g., DIMMs) within memory 105 operatively coupled to an instance of bus 115.

In some embodiments, system resource program 300 determines whether memory resources within system 102 are configured based on respective memory-ratings. In various embodiments, system resource program 300 identifies additional information and/or constraints (e.g., physical limitations) corresponding to a memory resource, such as memory/data channels IDs within an instance of bus 115 related to a memory module, an instance of subsystem 120 utilized to control and access the memory module, and/or the IDs corresponding to the processors or cores that can access a respective memory module. In an embodiment, system resource program 300 stores new or changed information associated with the characteristics corresponding to identified memory resources within system information 119.

In step 304, system resource program 300 determines capabilities of the system related to configuring the memory resources of the system. System resource program 300 determines capabilities of one or more instances of bus 115, one or more instances of subsystem 120, or a combination thereof for configuring a plurality of memory resources within memory 105 for one or more portions of system 102. In one embodiment, system resource program 300 determines capabilities of a system related to the memory resources of system 102 based on accessing configuration information (not shown) for system 102 and/or instances of computing subsystem 103. Information related to the capabilities of a system may be stored in one or more configuration files within system information 119, in firmware, on a system element (not shown), etc. In various embodiments, system resource program 300 determines capabilities of subsystem 120 and one or more instances of PFC 123 to tune or to calibrate related instances of register(s) 125 to utilize memory resources (e.g., DIMMs) of differing memory-ratings within a corresponding instance of memory 105 and one or more related processors or cores (not shown).

In some embodiments, system resource program 300 also determines constraints (e.g., relationships) associated with memory resources of the system. In an example, system resource program 300 utilizes hypervisor 111 and system functions 112 to map the relationships among processor cores (not shown), data channels of one or more instances of bus 115, one or more instances of subsystem 120, and DIMMs within a respective instance of memory 105 (previously discussed with respect to FIG. 2). In addition, system resource program 300 utilizes one or more aspects of system functions 112 to determine various parameters utilized by respective instances of PFC 123 to configure related memory resources of memory 105 based on a memory-rating and associated information. In a further embodiment, system resource program 300 interfaces with hypervisor 111 and/or system functions 112 to identify changes to a portion of system 102 that affect the memory resources of system 102 and update system information 119. In an example, system resource program 300 can respond to an administrator of system 102 dynamically activating or deactivating hardware resources within system 102.

In step 305, system resource program 300 configures a memory subsystem of the system. System resource program 300 applies (e.g., downloads) various parameters from system information 119 to aspects of one or more instances of subsystem 120 to configure access to memory resources within an instance of memory 105 based on respective memory-ratings of corresponding memory resources. System resource program 300 may also configure access to portions of an instance of bus 115 based on respective memory-ratings. For example, system resource program 300 identifies to subsystem 120 the communication channels within bus 115 associated with accessing a group of DDR4 memory modules. In one embodiment, system resource program 300 configures respective instances of subsystem 120 with system 102 or one or more instances of computing subsystem 103 based on the identified characteristic of memory resources and various capabilities of a system to configure the identified memory resources.

In some embodiments and based on a loading of work assigned to system 102 and/or respective instances of computing subsystem 103, system resource program 300 can interface with hypervisor 111 to deactivate, or exclude from use, lower-rated memory resources of a mixed group of memory resources. Subsequently, system resource program 300 configures the higher-rated memory resources to operate in a performance-enhancing mode (e.g., DDR4 memory operates as DDR4 as opposed to DDR3 compatibility mode). In other embodiments, responsive to determining that one or more changes to workloads within system 102 releases a threshold quantity of resources (e.g., memory) that previously were not configured to operate in a performance-enhancing mode, system resource program 300 reconfigures one or more instances of subsystem 120, respective instances of PFC 123, and a portion of the released memory resources within an instance of memory 105 to operate in a performance-enhancing mode.

Still referring to step 305 in a further embodiment, system resource program 300 configures a one or more aspects of subsystem 120 associated with a computer processors chip. In an example, system resource program 300 interfaces with hypervisor 111 or other firmware (not shown) of computing subsystem 103 to dynamically power off processor components, change one or more instances of register(s) 125, and reinitialize the powered-off processors components during the operation of computing subsystem 103 while minimizing affects to processes executing on the processor.

In step 306, system resource program 300 identifies a set of resources of the system utilized by a workload. Information associated with a set of resources utilized by a workload include: LPAR IDs, process IDs, memory resource allocation by memory-rating, processor/core IDs corresponding to allocated cores, etc. In one embodiment, system resource program 300 identifies a set of resources of system 102 utilized by a workload and associated processes based on historic information stored within workload information 117. In another embodiment, system resource program 300 identifies a set of resources of system 102 utilized by a workload and associated processes by interfacing with hypervisor 111 and/or system functions 112 to identify resources of system 102 that are allocated to one or more currently executing workloads.

In step 308, system resource program 300 monitors processes associated with a workload. In an embodiment, system resource program 300 utilizes hypervisor 111 and/or system functions 112 to monitor a plurality of processes associated with a workload. In an example, system resource program 300 obtains monitoring information that includes, but is not limited to, rates of memory usage, rates of I/O operations related to storage utilization, rates of I/O operation related to network utilization, computation rates, virtual memory paging space utilization, etc. In some embodiments, one instance of system resource program 300 can monitor a plurality of processes that execute within a portion of system 102.

In step 310, system resource program 300 analyzes a utilization associated with the set of memory resources allocated to a workload. In an embodiment, system resource program 300 utilizes one or more aspects of system functions 112 to perform various analyses related to the monitoring of an executing workload, such as determining an average transaction time per unit of allocated memory, I/O operations per unit time for storage, a percentage of memory utilization, a computation rate, a rate of virtual page swapping, etc. In various embodiments, system resource program 300 analyzes monitoring information at the LPAR and/or process level for the workload. System resource program 300 includes the output of the analyses within one or more profile logs related to the executing workload within workload information 117.

In some embodiments, system resource program 300 further analyzes a utilization associated with the set of memory resources allocated to a workload based on the memory-rating of the memory resources utilized by one or more processes of the executing workload. In addition, system resource program 300 may determine a set of performance metrics for the workload that are utilized to determine which aspects of the workload benefit from utilizing performance-enhancing memory resources in response to determining that performance-enhancing memory resources available for allocation to the workload are constrained. In some scenarios, system resource program 300 analyzes performance metrics based on memory allocations among processes of an LPAR or based on memory allocations among LPARs. In other scenarios, system resource program 300 utilizes a holistic performance analysis for a workload to determine an allocation of the constrained memory resources across the workload to improve the overall (e.g., global) metrics of the workload as opposed to process-specific and/or LPAR-specific performance optimizations.

FIG. 4 depicts a flowchart depicting operational steps for memory allocation program 400, a program that allocates memory resources of a computing system or server to one or more portions of a workload to provide a performance improvement for the workload, in accordance with an embodiment of the present invention. In various embodiments, multiple instances of memory allocation program 400 execute concurrently within one or more portions of system 102. In some embodiments, memory allocation program 400 executes one or more steps and/or decisions in parallel for a workload comprised of a plurality of processes.

In step 402, memory allocation program 400 identifies information related to a workload to execute. Information related to a workload may include a list of processes, services, and/or applications utilized by the workload and respective quantities of resources to provision for the LPARs and/or containers utilized by the workload. In one embodiment, memory allocation program 400 identifies information related to a workload to execute based on information within workload information 117, such as one or more workload profiles corresponding to the workload to execute. In another embodiment, memory allocation program 400 identifies information related to a workload to execute from information provided by a user. In some embodiments, memory allocation program 400 also determines information related to user weightages, process ranking, priority information, user preferences, workload constraints, cutoff values, and/or threshold values associated with a utilization or distribution of memory resources of differing memory-rating among aspects of the workload.

In step 404, memory allocation program 400 identifies available memory resources of a system. Memory allocation program 400 identifies available memory resources and respective memory-ratings within an instance of system 102 and/or respective instances of computing subsystem 103. In one embodiment, memory allocation program 400 identifies available memory resources of system 102 based on information stored within system information 119. In another embodiment, memory allocation program 400 interfaces with hypervisor 111 and/or system functions 112 to identify available memory resources of system 102 and respective memory-ratings of the available memory resources of system 102.

In some embodiments, memory allocation program 400 also monitors the executing workload. In one scenario, memory allocation program 400 determines that the workload can obtain a performance enhancement based on replacing virtual paging space within storage 106 associated with one or more processes with memory resources of a lower performance rating, such as SCM or DDR3 type memory. In another scenario, in response to determining that a change associated with system 102 is identified (Yes branch, decision step 411), memory allocation program 400 identifies available memory resources of system 102 and respective memory-ratings of the memory resources related to the change associated with system 102. In various embodiments, memory allocation program 400 further determines, based on the information associated with a workload (e.g., to execute or currently executing) identified in Step 402 and the identified available memory resources, a set of memory resources to allocate to the workload. For example, the set of memory resources to allocate to the workload includes a distribution of memory resources based on memory-rating and memory resources assignments to specific LPARs, processes, and/or containers utilized by the workload.

In decision step 405, memory allocation program 400 determines whether performance-enhancing memory resources are available for allocation. In one embodiment, memory allocation program 400 determines that sufficient performance-enhancing memory resources are available for the workload based on a threshold value associated with memory resources within profile information 117 for the workload. Responsive to determining that performance-enhancing memory resources are available for allocation (Yes branch, decision step 405), memory allocation program 400 allocates memory resources (step 406).

In another embodiment, memory allocation program 400 determines that sufficient performance-enhancing memory resource are not available for allocation to the workload based on one or more criteria, such as a user-defined threshold value or dictate. In other embodiments, memory allocation program 400 determines that additional lower-rated memory resources are not available for allocation to replace virtual paging space within storage 106 for the workload. Responsive to determining that performance-enhancing memory resources are not available for allocation (No branch, decision step 405), memory allocation program 400 analyzes other workloads executing within the system (step 407).

In step 407, memory allocation program 400 analyzes other workloads executing within the system. Memory allocation program may utilize hypervisor 111 to identify the portions of a respective instance of system 102 that host and execute a plurality of processes related to the other workloads that execute within networked-computing environment 100. In one embodiment, memory allocation program 400 obtains information from workload information 117 related to analyses of prior (e.g., historical) executions of one or more other workloads executing within an instance of system 102. In some embodiments, memory allocation program 400 utilizes various aspects of system functions 112 to analyze other workloads or portions of the other workload that execute within an instance of system 102. In various embodiments, memory allocation program 400 analyzes a plurality of executing workloads to identify LPARs that are shared among workloads.

In other embodiments, memory allocation program 400 interfaces with one or more instances of system resource program 300 to obtain analyses associated with other workloads or portions of the other workload that execute within an instance of system 102 (previously discussed with respect to FIG. 3, step 308 and step 310). In various embodiments, memory allocation program 400 further analyzes the other executing workloads to identify and analyze other factors within workload information 117 associated with other executing workloads, such as user preferences, user constraints, weightage values associated with memory resources of LPARs and processes, and priorities corresponding to the other executing workloads.

In step 409, memory allocation program 400 identifies underutilized memory resources within the system. Memory allocation program 400 may also utilize priority information, performance analyses of other workload, and/or other criteria to determine whether memory resources allocated to a portion (e.g., one or more processes and/or containers) of another executing workload are identified as underutilized. In one embodiment, memory allocation program 400 identifies underutilized memory resources (e.g., performance-enhancing memory allocated to a non-critical or low-usage process/LPAR) associated with a portion of another workload executing within the same portion of system 102 as a portion of the workload to execute. In another embodiment, memory allocation program 400 identifies a set of memory resources associated with a lower priority portion of another workload executing within the same portion of system 102 as underutilized memory with respect to a higher priority portion of the workload to execute. In some embodiments, memory allocation program 400 analyzes LPARs shared among workloads to identify underutilized memory resources.

In various embodiments, memory allocation program 400 utilizes analyses associated with other workload performed in step 407 and information within respective workload profiles of the other workloads to identify lower-rated memory resources among the other executing workloads that can be designated for reallocation to the workload to replace virtual paging space. In other embodiments, memory allocation program 400 identifies a change to an executing workload, such as a priority change, to identify underutilized memory within an instance of system 102 that can be designated for reallocation to aspects of the executing workload.

Referring to step 406, memory allocation program 400 allocates memory resources. Memory allocation program 400 interfaces with hypervisor 111 to allocate memory resources among the LPARs of the workload based on various dictates and constraints associated with the workload. In addition, workload information 117 and system information 119 are updated based on the allocation of memory resources. Memory allocation program 400 may further update a profile or other information related to the workload indicating specific assignments of memory, such as LMB IDs, among the plurality of LPARs, processes, and/or containers of the workload.

In one embodiment, in response to determining that sufficient memory resources are available for allocation based on information associated with a profile for the workload (decision step 405), memory allocation program 400 allocates the available memory resources among aspects of the workload based on memory-rating dictates. In another embodiment, if insufficient memory resources, based on memory-rating dictates, are available to meet the dictates associated with the workload, memory allocation program 400 utilizes a combination of user preferences, weightage values, ranks, and/or cutoff values to allocate the available performance-enhancing memory resources among aspects of the workload, such as LPARs. In some embodiments, memory allocation program 400 includes additional designations that indicate which processes and/or containers associated with the workload are assigned the performance-enhancing memory resources allocated to the LPARs associated with the workload.

In other embodiments, memory allocation program 400 reallocates memory resources from among one or more other workloads to the workload. In one scenario, memory allocation program 400 reallocates memory resources from among one or more other workloads to the workload based on identifying underutilized memory resources. In another scenario, memory allocation program 400 reallocates memory resources from among one or more other workloads to the workload based on prioritization or performance dictates. In one example, LPAR 131 includes performance-enhancing memory that is assigned to process 133 of another workload. Memory allocation program 400 determines that process 137C of the workload is a higher priority process and is associated with a memory-rating dictate. Subsequently, memory allocation program 400 utilizes an aspect of system functions 112 to reassign (e.g., swap) lower-rated memory resources associated with process 137C with performance-enhancing memory assigned to process 133. In another example, memory allocation program 400 determines that process 137C utilizes storage 106 for virtual paging space. Memory allocation program 400 can utilize hypervisor 111 to allocate virtual paging space for process 132 and aspects of system functions 112 to swap data from DDR3 memory of process 132 for allocation to process 137C to replace the virtual paging space associated with process 137C.

In step 410, memory allocation program 400 executes a workload. In one embodiment, memory allocation program 400 executes a workload utilizing a threshold level of performance-enhancing memory resources. In another embodiment, memory allocation program 400 temporarily delays, based on a user preference, executing a workload until a threshold level of performance-enhancing memory resources become available. In some embodiments, memory allocation program 400 executes a workload without utilizing a threshold level of performance-enhancing memory resources. However, memory allocation program 400 loops via decision step 411 to reallocate of performance-enhancing memory resources to the workload as the of performance-enhancing memory resources become available within a portion of system 102. In various embodiments, memory allocation program 400 executes the workload based on specific assignments of memory to and among the plurality of LPARs, processes, and/or containers of the workload.

In decision step 411, memory allocation program 400 determines whether a change associated with a system is identified. In an embodiment, memory allocation program 400 pauses at decision step 411 while executing a workload that can benefit from utilizing performance-enhancing memory. In some embodiments, memory allocation program 400 interfaces with hypervisor 111 to identify whether a change occurs (e.g., one or more other workloads end, additional resources are activated/deactivated, etc.) within a portion of system 102 that executes a respective portion of the workload. Responsive to determining that a change associated with system 102 is identified (Yes branch, decision step 411), memory allocation program 400 loops to identify available memory resource of a system (step 406). In one embodiment, memory allocation program 400 loops to step 406 to identify whether the change associated with system 102 releases memory resources for reallocation. In other embodiments, if memory allocation program 400 determines based on one or more indications that the processes related to the workload are assigned sufficient performance-enhancing memory to improve the execution of the workload, then the instance of memory allocation program 400 associated with the workload terminates (No branch, decision step 411).

Figure 5:
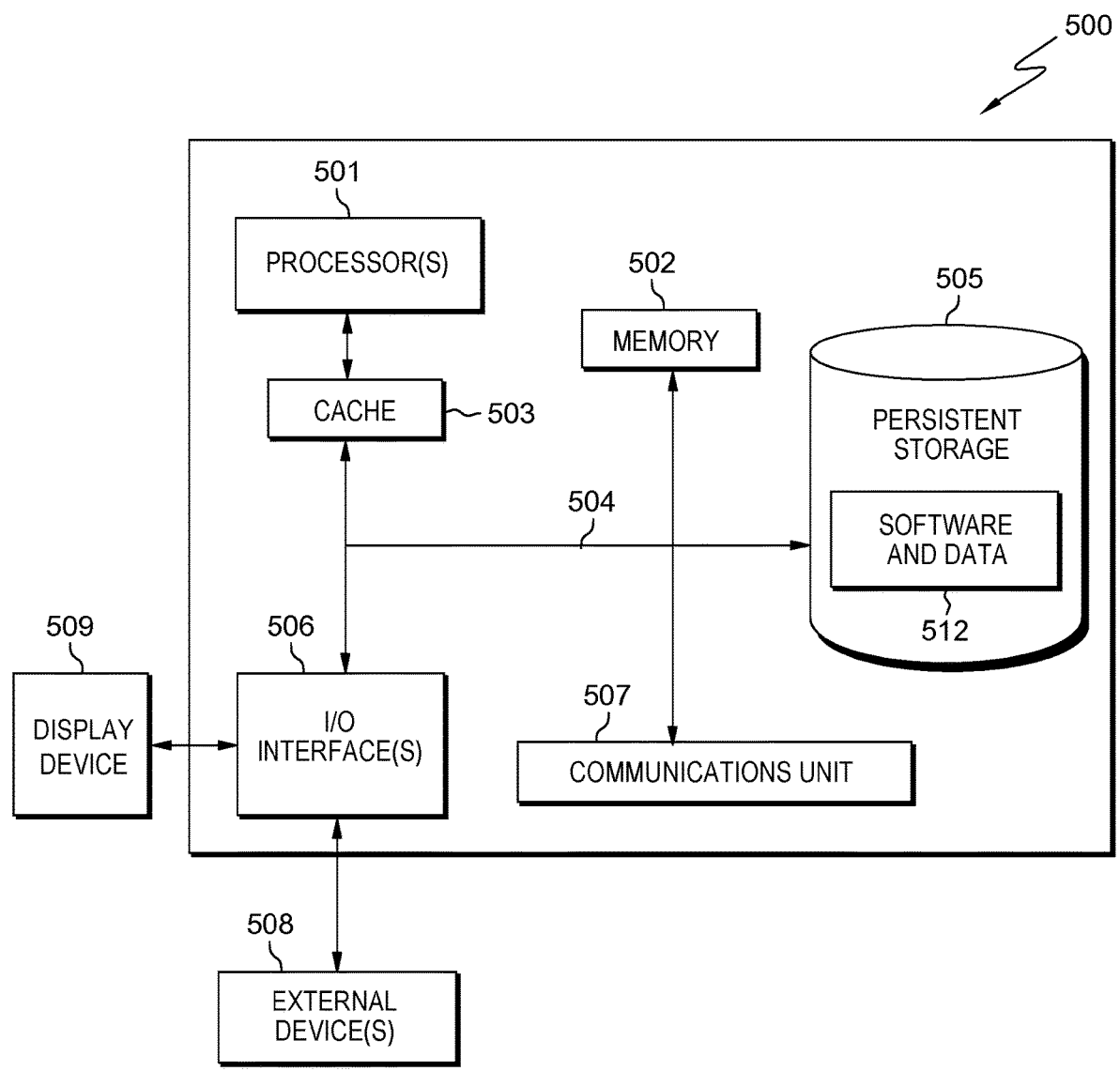
FIG. 5 is a block diagram of components of a computer, in accordance with an embodiment of the present invention.

FIG. 5 depicts computer system 500, which is representative of system 102, one or more instances of computing subsystem 103, and system 150. Computer system 500 is an example of a system that includes software and data 512. Computer system 500 includes processor(s) 501, memory 502, cache 503, persistent storage 505, communications unit 507, I/O interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch. In another example, an instance of bus 115 is representative of at least a portion of communications fabric 504.

Memory 502 and persistent storage 505 are computer readable storage media. In this embodiment, memory 502 includes random access memory (RAM). In general, memory 502 can include any suitable volatile or non-volatile computer readable storage media. In an example, memory 502 is repetitive of a plurality of memory DIMMs of differing rating within memory 105. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information. With respect to system 102 and or computing subsystem 103 persistent storage 505 includes storage 106 and system storage 107. With respect to instances of system 150 persistent storage 505 includes a plurality of storage devices (not shown).

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to system 102 and/or computing subsystem 103, software and data 512 includes hypervisor 111, system functions 112, workload information 117, system information 119, system resource program 300, memory allocation program 400, and various information, programs and databases, such as a virtualization program (not shown).

Communications unit 507, in these examples, provides for communications with other data processing systems or devices, including resources of system 102, computing subsystem 103, and system 150. In these examples, communications unit 507 includes one or more network interface cards. In another example, communications unit 507 is representative of various aspects within subsystem 120, such as memory controller 121 PFC 123, and registers 125. Communications unit 507 may provide communications through the use of either or both physical and wireless communications links. In addition, communications unit 507 may also be representative of various aspects of interconnect technology 116. Program instructions and data used to practice embodiments of the present invention may be downloaded to persistent storage 505 through communications unit 507. With respect to the present invention, communications unit 507 may represent communication interfaces that include various capabilities and support multiple protocols as previously discussed.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509. With respect to the present invention, I/O interface(s) 506 may include communication interfaces that include various capabilities and support multiple protocols as previously discussed.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for configuring hardware within a computing system, the method comprising:
    identifying, by one or more computer processors, information respectively associated with a plurality of hardware resources within a portion of a computing system;
    determining, by one or more computer processors, that a plurality of memory modules of differing performance ratings are operatively coupled to a shared bus fabric, wherein:
        (i) the shared bus fabric includes a plurality of data and communications channels;
        (ii) the plurality of data and communications channels enable selective access among the plurality of memory modules based on a respective performance rating of a memory module of the plurality of memory modules; and
        (iii) the plurality of data and communications channels enable the memory module to operate based on design capabilities as opposed to a compatibility-mode; and
    configuring, by one or more computer processors, a subsystem and two or more sets of channels of the shared bus fabric to selectively access respective groups of one or more memory modules from among the plurality of memory modules based on a performance rating corresponding to a respective group of one or more memory modules.

2. The method of claim 1, wherein the plurality of hardware resources within the portion of the computing system includes one or more computer processors, one or more subsystems associated with utilizing memory resources, the plurality of memory modules that includes memory modules of two or more respective performance ratings that differ, one or more accelerators cards, and one or more bus fabrics.

3. The method of claim 1, wherein configuring a subsystem and two or more sets of channels of the shared bus fabric to selectively access respective groups of one or more memory modules based on the performance rating corresponding to the group of one or more memory modules further comprises:
    identifying, by one or more computer processors, operational characteristics corresponding to the respective groups of one or more memory modules;
    determining, by one or more computer processors, one or more parameters based on the operational characteristics corresponding to the respective group of one or more memory modules; and
    configuring, by one or more computer processors, the subsystem by applying the determined one or more parameters to calibrate the subsystem to selectively access the respective groups of one or more memory modules that are operatively coupled to the shared bus fabric.

4. The method of claim 3, wherein of the operational characteristics related to a memory module include a column access strobe (CAS) latency value, a bandwidth value, and a rate of data transfer.

5. A computer program product for configuring hardware within a computing system, the computer program product comprising:
    one or more computer readable storage media and program instructions stored on the one or more computer readable storage media, the program instructions readable/executable by one or more computer processors:
        program instructions to identify information respectively associated with a plurality of hardware resources within a portion of a computing system;

program instructions to determine that a plurality of memory modules of differing performance ratings are operatively coupled to a shared bus fabric, wherein:
- (i) the shared bus fabric includes a plurality of data and communications channels;
- (ii) the plurality of data and communications channels enable selective access among the plurality of memory modules based on a respective performance rating of a memory module of the plurality of memory modules; and
- (iii) the plurality of data and communications channels enable the memory module to operate based on design capabilities as opposed to a compatibility-mode; and program instruction to configure a subsystem and two or more sets of channels of the shared bus fabric to selectively access respective groups of one or more memory modules from among the plurality of memory modules based on a performance rating corresponding to a respective group of one or more memory modules.

6. The computer program product of claim 5, wherein the plurality of hardware resources within the portion of the computing system includes one or more computer processors, one or more subsystems associated with utilizing memory resources, the plurality of memory modules that includes memory modules of two or more respective performance ratings that differ, one or more accelerators cards, and one or more bus fabrics.

7. The computer program product of claim 5, wherein program instructions to configure a subsystem and two or more sets of channels of the shared bus fabric to selectively access respective groups of one or more memory modules based on the performance rating corresponding to the group of one or more memory modules further comprise:
- program instructions to identify operational characteristics corresponding to the respective groups of one or more memory modules;
- program instructions to determine one or more parameters based on the operational characteristics corresponding to the respective group of one or more memory modules; and
- program instructions to configure the subsystem by applying the determined one or more parameters to calibrate the subsystem to selectively access the respective groups of one or more memory modules that are operatively coupled to the shared bus fabric.

8. The computer program product of claim 7, wherein the operational characteristics related to a memory module include a column access strobe (CAS) latency value, a bandwidth value, and a rate of data transfer.

9. A computer system for configuring hardware within a portion of the computing system, the computer system comprising:
- one or more computer processors;
- one or more computer readable storage media; and
- program instructions stored on the computer readable storage media for execution by at least one of the one or more computer processors, the program instructions comprising:
  - program instructions to identify information respectively associated with a plurality of hardware resources within a portion of a computing system;
  - program instructions to determine that a plurality of memory modules of differing performance ratings are operatively coupled to a shared bus fabric, wherein:
    - (i) the shared bus fabric includes a plurality of data and communications channels;
    - (ii) the plurality of data and communications channels enable selective access among the plurality of memory modules based on a respective performance rating of a memory module of the plurality of memory modules; and
    - (iii) the plurality of data and communications channels enable the memory module to operate based on design capabilities as opposed to a compatibility-mode; and
  - program instruction to configure a subsystem and two or more sets of channels of the shared bus fabric to selectively access respective groups of one or more memory modules from among the plurality of memory modules based on a performance rating corresponding to a respective group of one or more memory modules.

10. The computer system of claim 9, wherein the plurality of hardware resources within the portion of the computing system includes one or more computer processors, one or more subsystems associated with utilizing memory resources, the plurality of memory modules that includes memory modules of two or more respective performance ratings that differ, one or more accelerators cards, and one or more bus fabrics.

11. The computer system of claim 9, further comprising:
a subsystem,
- wherein the subsystem includes at least one performance controller and two or more base address registers; and
- wherein the at least one performance controller within the subsystem modifies operations of two or more respective base address registers based on operational characteristics corresponding to two or more respective groups of memory modules.

12. The computer system of claim 11, wherein the characteristics related to a memory module includes a column access strobe (CAS) latency value, a bandwidth value, and a rate of data transfer.

13. The computer system of claim 9, further comprising:
one or more multi-core processor modules associated with the portion of the computing system, wherein a multi-core processor module includes at least one subsystem operatively coupled to each group of one or more processor cores within the multi-core processor module.

14. The computer system of claim 9, further comprising:
one or more multi-core processor modules associated with the portion of the computing system,
- wherein a multi-core processor module includes at least one multi-core processor chip;
- wherein a multi-core processor chip includes two or more groups of processor cores; and
- wherein each group of processor cores further includes an instance of a subsystem incorporated within an architecture of the multi-core processor chip.

15. The method of claim 1, further comprising:
determining, by one or more computer processors, that the portion of the computer system includes another hardware element that includes at least a memory control function and performs direct-memory access (DMA) via the shared bus fabric;

identifying, by one or more computer processors, a set of memory modules from among the plurality of memory modules that are associated with the other hardware element;

determining, by one or more computer processors, a set of operational characteristics corresponding to set of memory modules associated with the other hardware element; and configuring, by one or more computer processors, the memory control function of the other hardware element based on the set of operational characteristics corresponding to set of memory modules associated with the other hardware element.

16. The computer program product of claim 5, further comprising:

program instructions to determine that the portion of the computer system includes another hardware element that includes at least a memory control function and performs direct-memory access (DMA) via the shared bus fabric;

program instructions to identify a set of memory modules from among the plurality of memory modules that are associated with the other hardware element;

program instructions to determine a set of operational characteristics corresponding to set of memory modules associated with the other hardware element; and program instructions to configure the memory control function of the other hardware element based on the set of operational characteristics corresponding to set of memory modules associated with the other hardware element.

17. The method of claim 1, further comprising:

determining, by one or more computer processors, that the portion of the computer system includes an accelerator card that includes memory resources;

determining, by one or more processors, that a computer processor of the portion of the system interfaces with the accelerator card via a portion of the shared bus that is different from the data and communication channels operatively coupled to the plurality of memory modules;

determining, by one or more computer processors, a set of operational characteristics corresponding to the memory resources included within the accelerator card; and configuring, by one or more computer processors, based on the determined set of operational characteristics of the memory resources included within the accelerator card, another subsystem included within the computer processor, wherein the other subsystem enables the computer processor to directly access the memory resources of the accelerator card.

18. The computer program product of claim 5, further comprising:

program instructions to determine that the portion of the computer system includes an accelerator card that includes memory resources, wherein a computer processor of the portion of the system interfaces with the accelerator card via a portion of the shared bus different from the data and communication channels operatively coupled to the plurality of memory modules;

program instructions to determine a set of operational characteristics corresponding to the memory resources included within the accelerator card; and program instructions to configure, based on the determined set of operational characteristics of the memory resources included within the accelerator card, another subsystem included within the computer processor, wherein the other subsystem enables the computer processor to directly access the memory resources of the accelerator card.

19. The computer system of claim 9, further comprising:

program instructions to determine that the portion of the computer system includes an accelerator card that includes memory resources, wherein a computer processor of the portion of the system interfaces with the accelerator card via a portion of the shared bus different from the data and communication channels operatively coupled to the plurality of memory modules;

program instructions to determine a set of operational characteristics corresponding to the memory resources included within the accelerator card; and program instructions to configure, based on the determined set of operational characteristics of the memory resources included within the accelerator card, another subsystem included within the computer processor, wherein the other subsystem enables the computer processor to directly access the memory resources of the accelerator card.

20. The computer system of claim 19, wherein the other subsystem of the computer processor utilizes a coherent accelerator processor interface (CAPI) to directly access the memory resources of the accelerator card.

* * * * *